(12) United States Patent
Zhang et al.

(10) Patent No.: US 12,284,051 B1
(45) Date of Patent: Apr. 22, 2025

(54) COMPUTER NETWORK SYSTEM AND COMPUTER SYSTEM

(71) Applicant: Zhejiang University, Hangzhou (CN)

(72) Inventors: Qi Zhang, Hangzhou (CN); Yiyi Ma, Hangzhou (CN); Nian Ye, Hangzhou (CN); Jialing Liang, Hangzhou (CN)

( * ) Notice: Subject to any disclaimer, the term of this patent is extended or adjusted under 35 U.S.C. 154(b) by 0 days.

(21) Appl. No.: 18/999,676

(22) Filed: Dec. 23, 2024

(30) Foreign Application Priority Data

Aug. 21, 2024 (CN) .......................... 202411150642.X

(51) Int. Cl.
*H04L 12/40* (2006.01)
(52) U.S. Cl.
CPC .................................... *H04L 12/40* (2013.01)
(58) Field of Classification Search
None
See application file for complete search history.

(56) References Cited

U.S. PATENT DOCUMENTS

| | | | | |
|---|---|---|---|---|
| 2009/0323704 | A1* | 12/2009 | Hall | H04L 12/4625 370/401 |
| 2018/0091931 | A1* | 3/2018 | Orten | H04W 4/80 |
| 2018/0107599 | A1* | 4/2018 | Chuang | G06F 12/0813 |

FOREIGN PATENT DOCUMENTS

| | | |
|---|---|---|
| CN | 101083548 A | 12/2007 |
| CN | 103051474 A | 4/2013 |
| CN | 104052663 A | 9/2014 |
| CN | 105743691 A | 7/2016 |
| CN | 108595277 A | 9/2018 |
| CN | 112260866 A | 1/2021 |
| CN | 112751714 A | 5/2021 |
| CN | 115037624 A | 9/2022 |
| CN | 115514642 A | 12/2022 |
| CN | 118075198 A | 5/2024 |

OTHER PUBLICATIONS

Li Ke et al. <Design and simulation of multi domain optical network topology aggregation algorithm>, <Electronic Design Engineering>, Aug. 2020, vol. 28, No. 15, entire document.

* cited by examiner

*Primary Examiner* — Diane L Lo

(57) ABSTRACT

The present disclosure provides a computer network system. The computer network system includes: a high-performance computing network, where the high-performance computing network includes at least four computers, a topology relation of the large regions in the computational domain corresponds to a topology relation of the high-performance computing network, and the topology relation of the high-performance computing network is that the plurality of computers in the high-performance computing network form a ring topology or a daisy-chain topology by wired connection; where the management network includes all the computers in the high-performance computing network and computers having result post-processing for storage and computation, and all the computers in the management network are connected by switches or routers to form a star network topology. The present application provides a computer network system and a computer system, solves the problem of poor performance greatly influenced by bandwidth and latency.

7 Claims, 4 Drawing Sheets

COMPUTER NETWORK SYSTEM AND COMPUTER SYSTEM

CROSS-REFERENCE TO RELATED APPLICATIONS

The present application claims priority to Chinese Patent Application No. 202411150642. X, filed on Aug. 21, 2024, the entire disclosure of which is incorporated herein by reference.

TECHNICAL FIELD

The present disclosure relates to a computer network system and a computer system.

BACKGROUND

A finite element method and a finite volume method are commonly used numerical methods for solving continuous medium problems such as solid deformation and fluid motion, and belong to the mesh-based methods, that is, a computational domain is divided into small mesh elements. Correspondingly, a control equation acting in the computational domain is discretized from partial differential equations into an algebraic equation set. This algebraic equation set is solved using a parallel algorithm. That is, the computational domain is partitioned, each partition is assigned to a process to solve the algebraic equation set corresponding to the computational domain, and there are interfaces between adjacent partitions, data on the interfaces are synchronized through inter-process communication, and different processes compute physical quantities of all partitions in parallel. Typically, each process is handled by a core of a central processing unit. The entire computational domain is divided into hundreds or thousands of partitions to be computed by a number of multi-core computers within a same network. Consequently, the solving speed of the entire computational domain depends on computational performance of individual cores and communication capabilities among the cores.

In the same computational domain, communication occurs only between adjacent partitions, that is, at the partition interface, so the communication is local rather than global. The communication occurs between the cores of the central processing units of the computers. The cores of the communication may be located in the same computer or may be distributed in different computers in the same network, with the help of a network card for communication. The communication performance between the cores of the same computer is better, but the communication between the cores with the help of the network card is affected more by the bandwidth and latency, and the performance is poorer. Slower links in the network are performance shortcomings due to data consistency requirements.

SUMMARY

As for shortcomings of the prior art, the present application provides a computer network system and a computer system, solves the problem of poor performance greatly influenced by bandwidth and latency, achieves an effect that communication latency between adjacent computational nodes is approximately equal, and enhances communication performance between adjacent computers to improve computing efficiency.

In order to achieve the above objective, the present disclosure provides a computer network system. The computer network system includes: a high-performance computing network, where the high-performance computing network includes at least four computers, each of the computers in the high-performance computing network solves a large region in a computational domain, a topology relation of the large regions in the computational domain corresponds to a topology relation of the high-performance computing network, and the topology relation of the high-performance computing network is that the plurality of computers in the high-performance computing network form a ring topology or a daisy chain topology by means of wired connection; and a management network, where the management network includes all the computers in the high-performance computing network and computers having result post-processing for storage and computation, and all the computers in the management network are connected by means of switches or routers to form a star network topology.

Further, the plurality of computers of the high-performance computing network are each provided with two single-port high-speed network cards, and the plurality of computers of the high-performance computing network are individually placed at corresponding levels of a single cabinet in sequence and form a single ring network topology in a single-cabinet wiring mode; and in the single-cabinet wiring mode, n computers are numbered from top to bottom or from bottom to top, that is, Ai, i is (1, 2, ..., n), then the computers with corresponding numbers are connected through high-speed copper cables one by one, Ai is connected to A(i+k) % n, k is an integer closest to n/2 and coprime with n, when k contains two integers closest to n/2 and coprime with n, k takes an integer greater than n/2 or an integer less than n/2, % is a modulo operation, and when (i+k) % n is equal to 0, Ai is connected to An.

Further, the plurality of computers of the high-performance computing network are each provided with a dual-port high-speed network card, and the plurality of computers of the high-performance computing network are placed in two adjacent cabinets A and B and form a single ring network topology in a dual-cabinet wiring mode; and in the dual-cabinet wiring mode, the computers in the cabinets A and B are numbered as Ai and Bi from top to bottom or from bottom to top, i is (1, 2, ..., n), then the computers with corresponding numbers are connected through high-speed copper cables, Ai is connected to Ai+1, An is connected to Bn, Bi is connected to Bi+1, A1 is connected to B1, and when i+1 is equal to n, An is connected to Bn.

Further, the high-speed network card is a programmable network card, uses an infiniband communication protocol, and uses data processing unit (DPU) hardware.

The present disclosure further provides a computer network system. First layer division is that the computational domain is divided into N regions, N is a number of computers participating in solution in the high-performance computing network, a number of elements in each region is approximately equal, each region has one or two adjacent regions, and the computers belonging to the spatially adjacent regions on the computational domain are also adjacent on the topology of the high-performance computing network; and second layer division is that the N regions are divided into M subregions, M is the number of threads that a single computer participates in solution, the number of elements in each subregion is approximately equal, each subregion has one or more adjacent subregions, and the subregions in the same region are bound to the same computer.

Further, a method for the first layer division specifically includes:

S1: performing orthogonal normalization on computational domain mesh, that is, converting mesh elements into regular polygons with a side length of 1;

S2: determining a partition path, and specifically, determining a straight line through centroids of two planes with a longest distance as the partition path on the mesh after orthogonal normalization; and S3: selecting N−1 bisecting points of the partition path, determining a normal plane, and dividing the computational domain into N regions, where N is the number of computers participating in solution in the high-performance computing network, and the number of elements in each region is approximately equal.

Further, a method for the second layer division specifically includes:

S1: determining the number M of subregions in each region, where M is less than or equal to the number of threads of a single computer participating in solution, and for a central processing unit using a hyperthreading technology, M is equal to the number of physical cores of the central processing unit; and for a central processing unit that uses or enables no hyperthreading, M is equal to the number of the physical cores of the central processing unit of the single computer minus the number of the central processing unit of the single computer; and S2: dividing each region into the M subregions using the metis or scotch algorithm, where the number of elements in each subregion is approximately equal, and each subregion has one or more adjacent subregions.

The present disclosure also provides a computer system including the computer network system, so as to implement the steps of the computer network system.

Beneficial Effects

1. The present disclosure is used to implement inter-thread communication required for parallel computation of finite element method and finite volume method solvers through the high-performance computing network with a ring network topology or daisy-chain topology, and is also used for general communication needs such as network attached storage, network file system, remote login, and remote desktop through a star topology management network.

2. Since the cores in communication by the network card are greatly influenced by bandwidth and latency and have poor performance, adjacent computational domain are allocated to adjacent cores, and the communication performance of adjacent cores is enhanced. The advantage of low latency of adjacent computers is exerted through the ring topology or daisy-chain topology network, such that a wiring mode is proposed to achieve an effect that the communication latency of adjacent computational nodes is approximately equal. Combined with programmable characteristics of the high-speed smart network card, a load originally borne by the central processing units (CPUs) is offloaded to the smart network card, such that the performance of the CPUs is further exerted.

3. Compared with the prior art, the present application omits high-speed switch apparatuses and reduces the possibility of network paralysis caused by single apparatus failure, such that cost is reduced, a room space is saved, and transformation for existing computer clusters is facilitated.

4. The present application is compatible with existing finite element method (FEM)/finite volume method (FVM) solvers, further improving computational efficiency.

Figure 1:
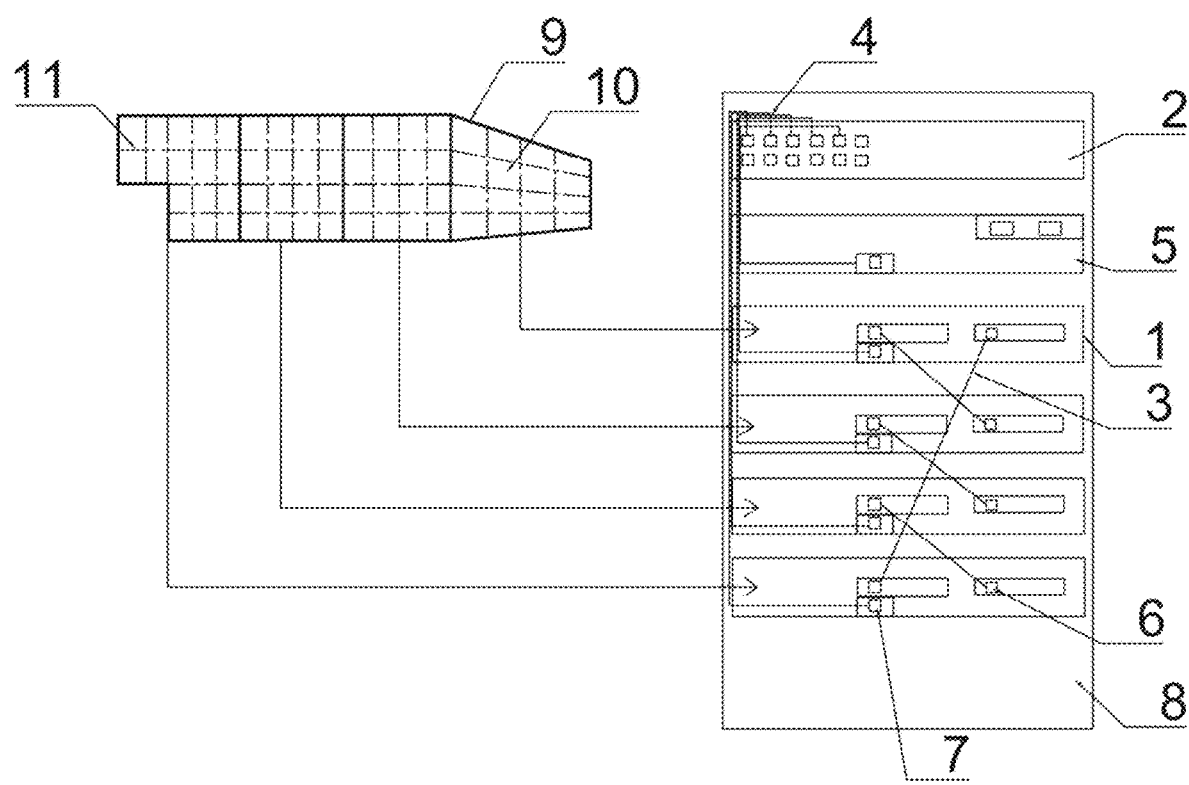
FIG. 1 is a schematic diagram of correspondence between a network topology and a computational domain.

Reference numerals: 1. computer; 2. switch; 3. high-speed copper cable; 4. shielded twisted pair; 5. computers configured to store and compute result post-processing; 6. high-speed network card; 7. Ethernet interface; 8. cabinet; 9. region; 10. subregion; 11. computational domain mesh; 12. orthogonal normalization; 13. partition path; 14. trisection point; 15. normal plane; and 16. centroid.

DETAILED DESCRIPTIONS OF THE EMBODIMENTS

In order to further explain technical means and effects used by the present disclosure to achieve the predetermined objects of the present disclosure, the specific embodiments, structures, features and effects according to the present disclosure are described in detail below in conjunction with the accompanying drawings and preferred examples.

Figure 2:
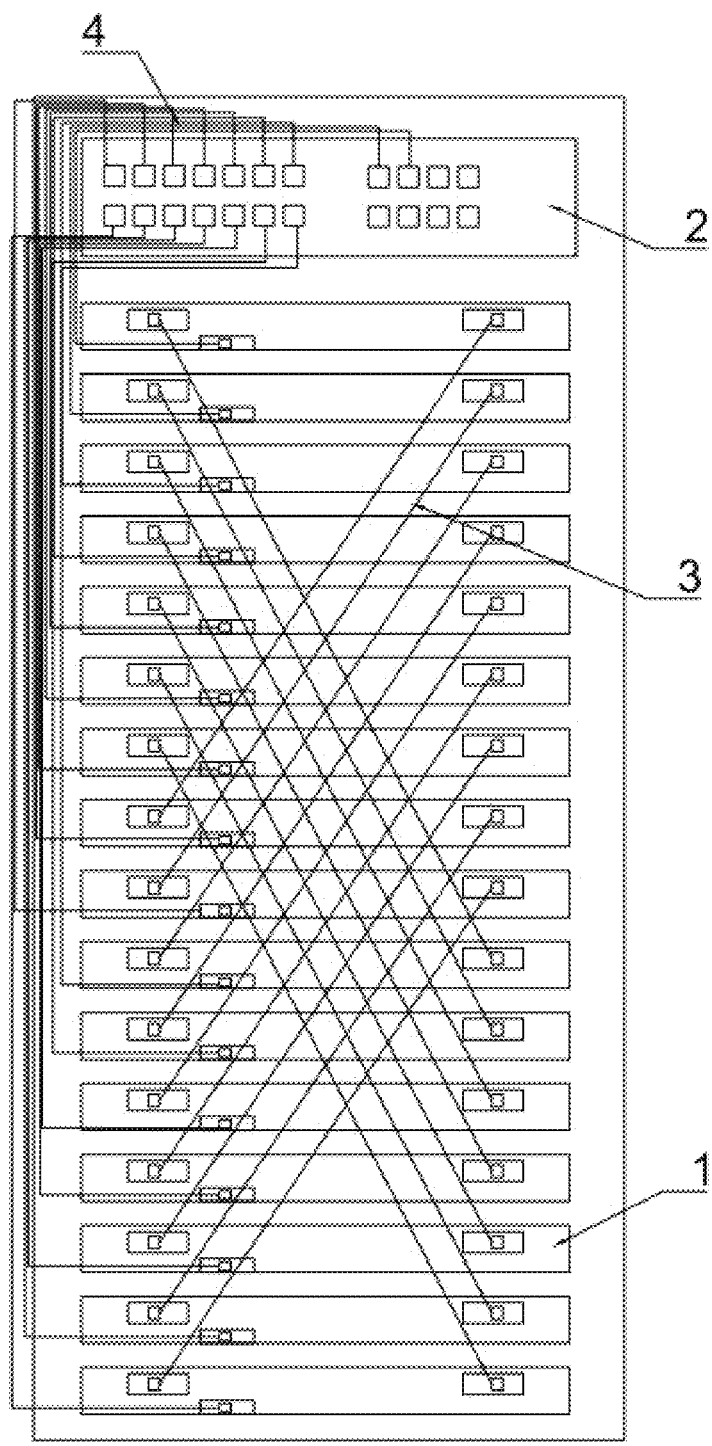
FIG. 2 is a schematic diagram of single-cabinet wiring.
Figure 3:
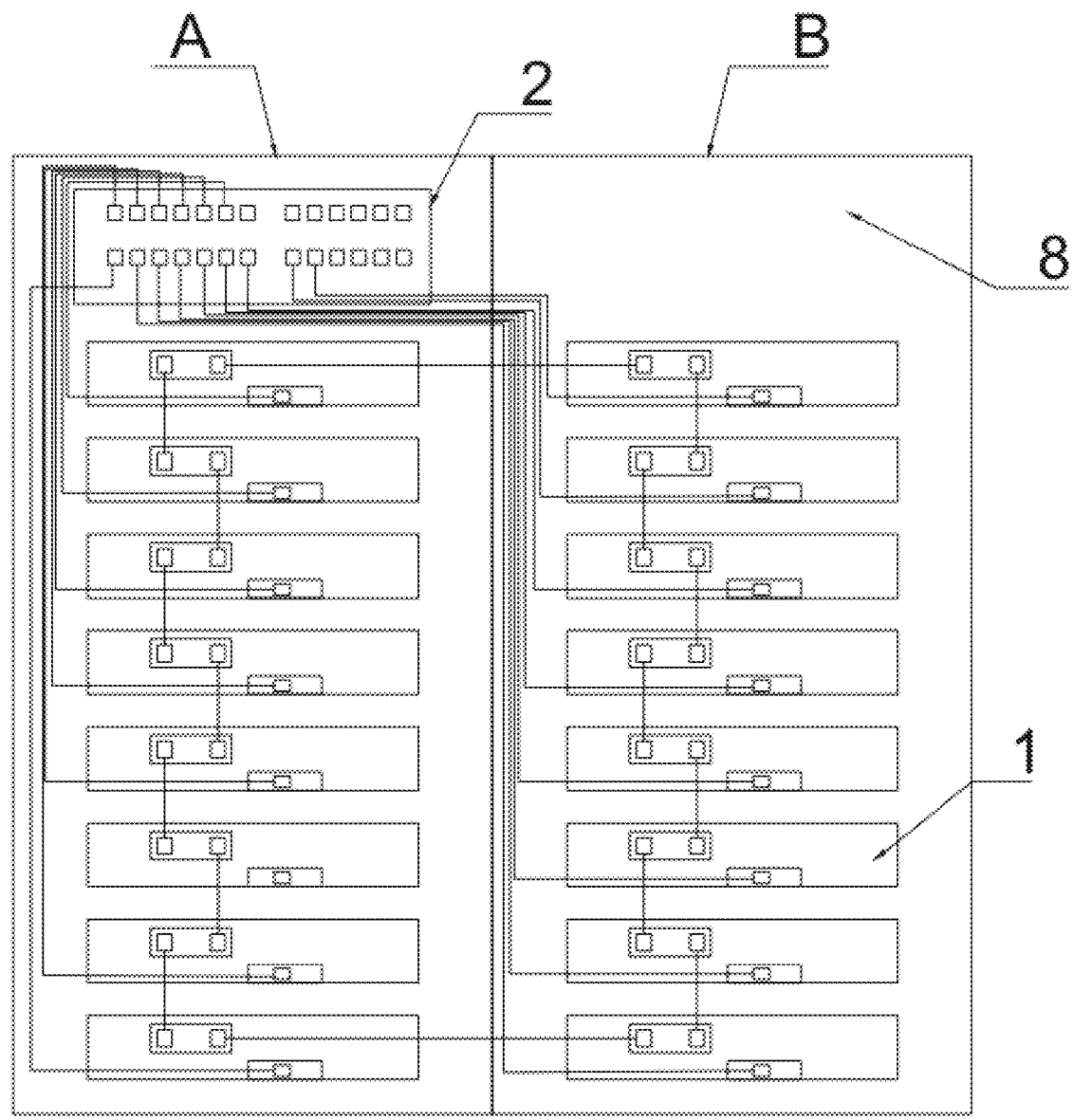
FIG. 3 is a schematic diagram of dual-cabinet wiring.

With reference to FIGS. 1-3, the present application provides a computer network system. The computer network system includes a high-performance computing network and a management network. The high-performance computing network is used for inter-thread communication required for parallel computation of finite element method and finite volume method solvers. Each of a plurality of computers 1 in the high-performance computing network has a corresponding region 9 in a computational domain. A topology relation of the regions 9 in the computational domain corresponds to a topology relation of the high-performance computing network. The topology relation of the high-performance computing network is that the plurality of computers 1 in the high-performance computing network form a ring topology or a daisy chain topology by means of wired connection. The high-performance computer 1 network includes at least four computers 1. Central processing units and memories of the computers 1 have same specifications. The computers 1 are all equipped with high-speed network cards 6. The high-speed network cards 6 have a function of direct memory access. Port bandwidth of the high-speed network cards 6 is greater than or equal to 10 Gbps. Each high-speed network card 6 is a programmable network card, uses an infiniband communication protocol, and uses data processing unit (DPU) hardware, so as to implement enhanced functions such as transparent compression and sparse matrix compression, and calculation auxiliary functions such as simulation calculation result monitoring, real-time post-processing, file writing, etc. by using a data processing unit.

The high-speed network cards 6 are connected through high-speed copper cables 3 or optical fibers to form a ring network topology or a daisy-chain network topology. The high-speed copper cables 3 are preferably used in the present application. The management network is used for general communication requirements such as network additional storage, network file system, remote login and remote desktop, and specifically includes all the computers 1 in the high-performance computing network and computers 5 having result post-processing for storage and computation. Ethernet interfaces 7 of the computers 1 have bandwidth of less than or equal to 10 Gbps and is connected to switches 2 or routers through shielded twisted pairs 4 to form a star network topology. Through the high-performance computing network with the ring topology or daisy-chain topology and the management network with the star topology, communication overhead is further reduced, communication performance is improved, and then finite element method (FEM)/finite volume method (FVM) computing efficiency is improved. The communication occurs between the cores. The cores of the communication may be located in the same computer 1 or may be distributed in different computers 1 in the same network, with the help of a network card for communication. The communication performance between the cores of the same computer 1 is better, but the communication between the cores with the help of the network card is more affected by the bandwidth and latency, and the performance is poorer. Therefore, the present application proposes an effective idea of allocating adjacent computational domain partitions to adjacent cores and enhancing the communication performance of adjacent cores, thereby improving computing efficiency. In order to achieve the effect that adjacent computers 1 have same communication latency, a single-cabinet 8 wiring mode and a dual-cabinet 8 wiring mode are proposed, one of the two modes is selected, and the dual-cabinet 8 wiring mode is preferred.

With reference to FIG. 3, the dual-cabinet 8 wiring mode is shown. In the dual-cabinet 8 wiring mode, the computers 1 in the cabinets 8 A and B are numbered as Ai and Bi from top to bottom or from bottom to top, i is (1, 2, . . . , n), then the computers 1 with corresponding numbers are connected through high-speed copper cables 3, Ai is connected to Ai+1, An is connected to Bn, Bi is connected to Bi+1, A1 is connected to B1, and when i+1 is equal to n, An is connected to Bn. In the present application, n is 16 as an example. See Table 1 below for apparatus models. Each server is equipped with a high-speed network card 6. The high-speed network card 6 is connected to an OCP interface of the server. Each high-speed network card 6 has two infiniband ports. A speed of each port is 100 Gbps. The high-speed network cards 6 are installed on the OCP interface on a right side of the server in the cabinet 8 A and on the OCP interface on a left side of the server in the cabinet 8 B, so as to reduce a length of the high-speed copper cable 3. The arrangement allows the high-speed copper cable 3 to be no more than 0.5 m, standard off-the-shelf wire can be used, and latency is low. The first layer of the server in the cabinet 8 A (denoted as A1, and so on) is connected to A2, A2 is connected to A3, and so on. A8 is connected to B8, B8 is connected to B7, and so on. B2 is connected to B1, B1 is connected to A1, and then the high-performance computing network with the ring topology is formed. A server motherboard is equipped with two Gigabit Ethernet interfaces 7. And any one of the Gigabit Ethernet interfaces is connected to the switch 2 by using the shielded twisted pair 4. The twisted pair are arranged along an edge of the cabinet 8 to form the management network with the star topology.

TABLE 1

Model list of dual-cabinet apparatus

| Serial number | Name | Number | Unit | Specification |
|---|---|---|---|---|
| 1 | Cabinet | 2 | Pieces | 41U 19-inch server cabinet |
| 2 | Switch | 1 | Pieces | Cisco Catalyst 3550-24 gigabit Ethernet switch |
| 3 | Server | 16 | Pieces | Dell PowerEdge R7525 2U rack server |
| 4 | High-speed network card | 16 | Pieces | NVIDIA ConnectX ®-6 infiniband dual-port 100 Gbps |
| 5 | Uninterruptible power supply | 2 | Pieces | Dell 10KW WW on-line UPS uninterruptible power supply |
| 6 | High-speed copper cable | 16 | Pieces | NVIDIA 100 Gbps DAC 0.5 m high-speed copper cable |
| 7 | Shielded twisted pair | 16 | Pieces | Category 5E shielded twisted pair are cut by a length on demand on-site. |

With reference to FIG. 2, in the single-cabinet 8 wiring mode, n computers 1 (see Table 2 for apparatus model) are numbered from top to bottom or from bottom to top, that is Ai, i is (1, 2, . . . , n), then the computers 1 with the corresponding numbers are connected through the high-speed copper cables 3 one by one, Ai is connected to A(i+k) % n, and when (i+k) % n is equal to 0, Ai is connected to An; k is an integer closest to n/2 and coprime with n, and % is a modulo operation; when k contains two integers closest to n/2 and coprime with n, k is an integer greater than n/2 or an integer less than n/2; and the copper cables are arranged in a cross, and a plastic bracket and a nylon cable tie are used to fix the cross. In the present application, n is 16 as an example. The 16 computers are placed in the same cabinet 8. Each computer is provided with two high-speed network cards 6, which are installed on PCIe interfaces on a left side and a right side of the server respectively, such that effects of larger cable spacing and less crossing can be achieved, and cable signal interference can be reduced. The PCIe interfaces on the left side and the right side are connected to different CPUs in the server respectively. Each CPU is connected to one network card, such that a load of the CPU is balanced. Under the condition of 16 servers, k is taken as 7 or 9. Copper cable connection formed by substitution of the values of 7 and 9 is the same, such that one of the values can be selected according to an actual situation during computation. The application takes k equal to 7 as an example, A1 is connected to A (1+7) % 16, A (1+7) % 16 is A8, and % is a modulo operation to obtain a remainder. That is, A1 is connected to A8, and so on until A9 is connected to A (9+7) % 16. When A (9+7) % 16 equals A0, that is, A9 is connected to A16, the connection forms a ring topology, as shown in FIG. 2.

TABLE 2

Model list of single-cabinet apparatus

| Serial number | Name | Number | Unit | Specification |
|---|---|---|---|---|
| 1 | Cabinet | 1 | Pieces | 41U 19-inch server cabinet |
| 2 | Switch | 1 | Pieces | Cisco Catalyst 3550-24 gigabit Ethernet switch |
| 3 | Server | 16 | Pieces | Dell PowerEdge R7525 2U rack server |
| 4 | High-speed network card | 32 | Pieces | NVIDIA ConnectX ®-6 infiniband single-port 100 Gbps |

TABLE 2-continued

Model list of single-cabinet apparatus

| Serial number | Name | Number | Unit | Specification |
|---|---|---|---|---|
| 5 | Uninterruptible power supply | 1 | Pieces | Dell 10KW WW on-line UPS uninterruptible power supply |
| 6 | High-speed copper cable | 16 | Pieces | NVIDIA 100 Gbps DAC 1 m high-speed copper cable |
| 7 | Shielded twisted pair | 16 | Pieces | Category 5E shielded twisted pair are cut by a length on demand on-site. |

With reference to FIG. 1, the present application further provides a computer network system. Two layers of division are performed. The first layer division is that the computational domain is divided into N regions 9, and N is a number of computers 1 participating in solution in the high-performance computing network. A number of elements in each region 9 is approximately equal. Each region 9 has one or two adjacent regions 9, that is, one or two interfaces. The second layer division is that each region 9 is divided into M subregions 10. A number of the subregions 10 is equal to a number of threads that a single computer 1 participates in solution. The number of elements of each subregion 10 is approximately equal. Each subregion 10 has one or more adjacent subregions 10. The subregions 10 of the same region 9 are bound to the same computer 1, such that the topology relation of the region 9 corresponds to a network topology relation of the computer 1. That is to say, the computers 1 to which spatially adjacent regions 9 belong in the computational domain are also adjacent in the topology of the high-performance computing network, that is, partition formation of the regions 9 and the topology of the high-performance computing network can satisfy rotational symmetry or mirror image consistency. For example, the network topology is A1-A4-A3-A2-A1, and the computing mesh partition can be A4-A3-A2-A1 or A1-A2-A3-A4, which is a case of mirror image. The computing mesh partition can be A2-A1-A4-A3 or A1-A4-A3-A2, which is a case of rotational symmetry.

Specific steps for the first layer division are as follows: 1) orthogonal normalization 12 is performed on computational domain mesh 11, that is, mesh elements are converted into regular polygons with a side length of 1; 2) a partition path 13 is determined, and specifically, a straight line is determined through centroids 16 of two planes with a longest distance as the partition path 13 on the mesh after orthogonal normalization 12; and 3) N−1 bisecting points of the partition path 13 are selected, a normal plane 15 is determined, and the computational domain is divided into N regions 9, where N is the number of computers 1 participating in solution, and the number of elements in each region 9 is approximately equal.

Figure 4:
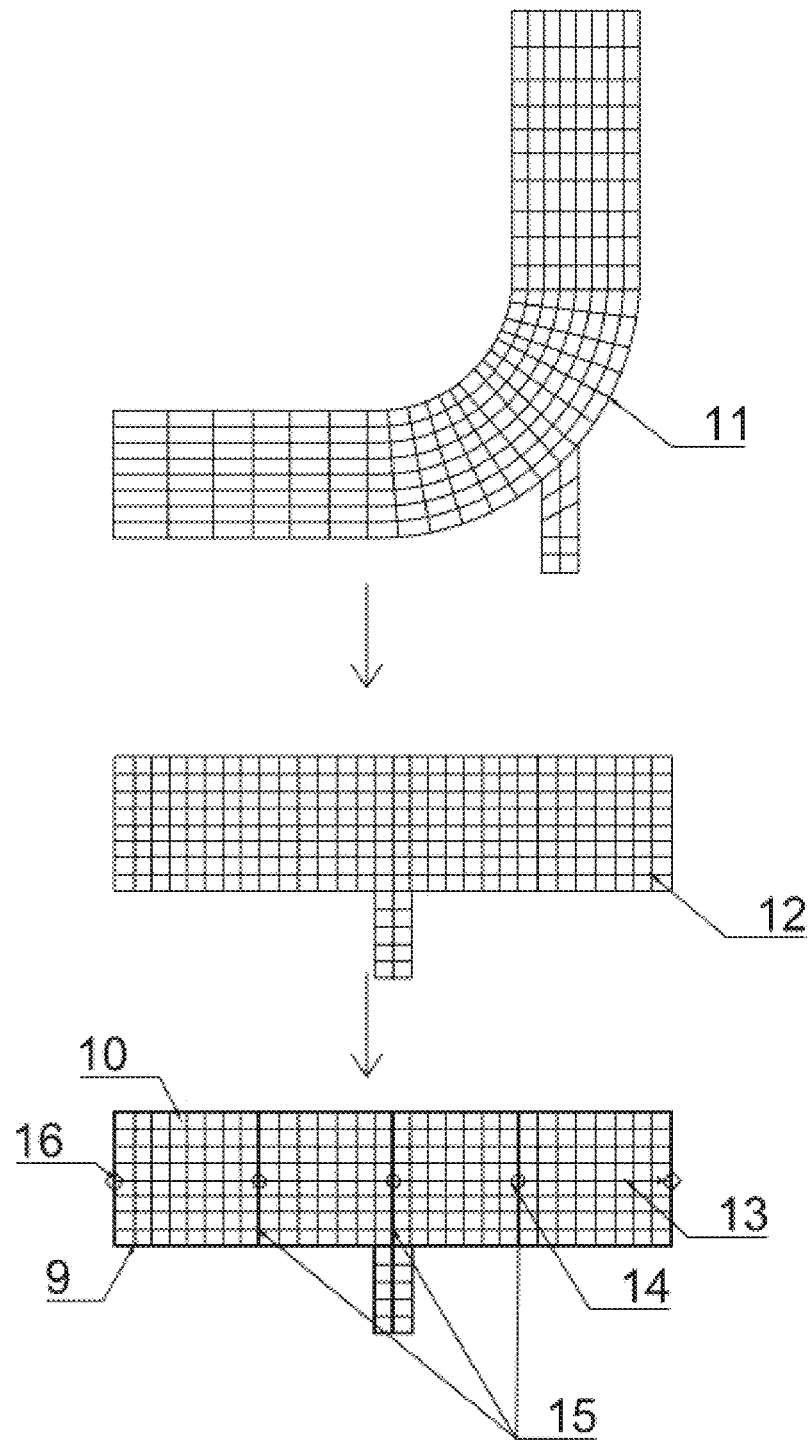
FIG. 4 is a schematic diagram of a computer network system in elbow pipe flow simulation.

Specific steps for the second layer division are as follows: 1) the number M of subregions 10 in each region 9 is determined, where M is less than or equal to the number of threads of a single computer 1 participating in solution, and for a central processing unit using a hyperthreading technology, M is equal to a number of physical cores of the central processing unit; and for a central processing unit that uses or enables no hyperthreading, M is equal to the number of the physical cores of the central processing unit of the single computer 1 minus the number of the central processing unit of the single computer 1, that is, one core of each central processing unit does not participate in solution; and 2) each region 9 is divided into the M subregions 10 using a metis or scotch algorithm, where the number of elements in each subregion 10 is approximately equal, and each subregion 10 has one or more adjacent subregions 10. The present application further provides an example for the computational domain division method, with reference to a schematic diagram of bending computational domain division shown in FIG. 4.

The present application also provides a computer system including the computer network system, so as to implement the steps of the computer network system.

The foregoing descriptions are merely some examples of the present disclosure, and are not intended to limit the present disclosure in any form. Although the present disclosure has been disclosed as above by means of the preferred examples, these examples are not for limiting the present disclosure. Those skilled in the art can make certain alterations or modifications by using the technical contents disclosed above without departing from the scope of the technical solutions of the present disclosure, so as to arrive at equivalent examples. Any brief modifications, equivalent changes and modifications not deviated from the contents of the technical solution of the present disclosure and made to the above examples according to the technical essence of the present disclosure still fall within the scope of the technical solution of the present disclosure.

What is claimed is:

1. A computer network system, comprising: a high-performance computing network, wherein the high-performance computing network comprises at least four computers, each of the computers in the high-performance computing network solves a region in a computational domain, a topology relation of the regions in the computational domain corresponds to a topology relation of the high-performance computing network, and the topology relation of the high-performance computing network is that the plurality of computers in the high-performance computing network form a ring topology or a daisy-chain topology by means of wired connection; and a management network, wherein the management network comprises all the computers in the high-performance computing network and computers configured to store and compute result post-processing, and all the computers in the management network are connected by means of switches or routers to form a star network topology;

The computational domain is divided into the first layer using the computational domain division method, and the computational domain is divided into N regions, N is a number of computers participating in solution in the high-performance computing network, a number of elements in each region is approximately equal, each region has one or two adjacent regions, and the computers belonging to the spatially adjacent regions on the computational domain are also adjacent on the topology of the high-performance computing network; and second layer division is that the N regions are divided into M subregions, M is a number of threads that a single computer participates in solution, a number of elements in each subregion is approximately equal, each subregion has one or more adjacent subregions, and the subregions in the same region are bound to the same computer.

2. The computer network system according to claim 1, wherein the plurality of computers of the high-performance computing network are each provided with two single-port high-speed network cards, and the plurality of computers of the high-performance computing network are individually placed at corresponding levels of a single cabinet in sequence and form a single ring network topology in a single-cabinet wiring mode; and in the single-cabinet wiring mode, n computers are numbered from top to bottom or from bottom to top, that is, Ai, i is 1, 2, . . . , n, then the computers with corresponding numbers are connected through high-speed copper cables one by one, Ai is connected to A(i+k) % n, k is an integer closest to n/2 and coprime with n, when k contains two integers closest to n/2 and coprime with n, k takes an integer greater than n/2 or an integer less than n/2, % is a modulo operation, and when (i+k) % n is equal to 0, Ai is connected to An.

3. The computer network system according to claim 2, wherein the high-speed network card is a programmable network card, uses an infiniband communication protocol, and uses data processing unit (DPU) hardware.

4. The computer network system according to claim 3, wherein a method for the first layer division specifically comprises:

S1: performing orthogonal normalization on computational domain mesh, and converting mesh elements into regular polygons with a side length of 1;

S2: determining a partition path, and specifically, determining a straight line through centroids of two planes with a longest distance as the partition path on the mesh after orthogonal normalization; and S3: selecting N−1 bisecting points of the partition path, determining a normal plane, and dividing the computational domain into N regions, wherein N is the number of computers participating in solution in the high-performance computing network, and the number of elements in each region is approximately equal.

5. The computer network system according to claim 4, wherein a method for the second layer division specifically comprises:

S1: determining the number M of subregions in each region, wherein M is less than or equal to the number of threads of a single computer participating in solution, and for a central processing unit using a hyper-threading technology, M is equal to a number of physical cores of the central processing unit; and for a central processing unit that uses or enables no hyperthreading, M is equal to the number of the physical cores of the central processing unit of the single computer minus the number of the central processing unit of the single computer; and S2: dividing each region into the M subregions using a metis or scotch algorithm, wherein the number of elements in each subregion is approximately equal, and each subregion has one or more adjacent subregions.

6. A computer system for implementing the computer network system according to claim 5.

7. The computer network system according to claim 1, wherein the plurality of computers of the high-performance computing network are each provided with a dual-port high-speed network card, and the plurality of computers of the high-performance computing network are placed in two adjacent cabinets A and B and form a single ring network topology in a dual-cabinet wiring mode; and in the dual-cabinet wiring mode, the computers in the cabinets A and B are numbered as Ai and Bi from top to bottom or from bottom to top, i is 1, 2, . . . , n, then the computers with corresponding numbers are connected through high-speed copper cables, Ai is connected to Ai+1, An is connected to Bn, Bi is connected to Bi+1, A1 is connected to B1, and when i+1 is equal to n, An is connected to Bn.

* * * * *